United States Patent
Fujimoto et al.

(10) Patent No.: US 10,065,341 B2
(45) Date of Patent: Sep. 4, 2018

(54) METHOD OF FORMING TOPPING SHEET AND APPARATUS THEREOF

(71) Applicant: TOYO TIRE & RUBBER CO., LTD., Osaka-shi, Osaka (JP)

(72) Inventors: Masaya Fujimoto, Osaka (JP); Kazuhiro Kobayashi, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 0 days.

(21) Appl. No.: 15/491,360

(22) Filed: Apr. 19, 2017

(65) Prior Publication Data

US 2017/0312941 A1    Nov. 2, 2017

(30) Foreign Application Priority Data

Apr. 27, 2016 (JP) ................. 2016-088978

(51) Int. Cl.
| | |
|---|---|
| B32B 41/00 | (2006.01) |
| B29B 15/12 | (2006.01) |
| B29D 30/38 | (2006.01) |
| B26D 1/03 | (2006.01) |
| B29D 30/46 | (2006.01) |
| B29C 43/24 | (2006.01) |

(Continued)

(52) U.S. Cl.
CPC ............ B29B 15/122 (2013.01); B26D 1/035 (2013.01); B26D 1/553 (2013.01); B26D 7/2628 (2013.01); B29C 43/24 (2013.01); B29C 43/28 (2013.01); B29D 30/38 (2013.01); B29D 30/46 (2013.01); B65H 35/00 (2013.01); B26D 2001/008 (2013.01); B29D 2030/466 (2013.01); B29K 2105/246 (2013.01)

(58) Field of Classification Search
CPC ........... B29L 315/122; B29L 2105/246; B29K 2105/246; B29B 15/122
USPC .......................... 156/64, 350, 351, 378, 379
See application file for complete search history.

(56) References Cited

U.S. PATENT DOCUMENTS

| | | |
|---|---|---|
| 1,452,379 A | 4/1923 | Haren et al. |
| 2005/0048857 A1 | 3/2005 | Terschueren et al. |

(Continued)

FOREIGN PATENT DOCUMENTS

| | | |
|---|---|---|
| DE | 2314889 A1 | 10/1974 |
| DE | 2433288 A1 | 2/1975 |

(Continued)

OTHER PUBLICATIONS

Extended European Search Report dated Sep. 4, 2017, issued in Application No. 17167144.9 (corresponds to U.S. Appl. No. 15/491,416).

(Continued)

*Primary Examiner* — Michael N Orlando
*Assistant Examiner* — Joshel Rivera
(74) *Attorney, Agent, or Firm* — Westerman, Hattori, Daniels & Adrian, LLP (57) ABSTRACT

A topping sheet forming method includes: feeding a textile original fabric, obtained by weaving longitudinally aligned tire cords into a cord fabric by use of weft yarns; cutting off the weft yarns at a predetermined widthwise position to divide the textile original fabric into a plurality of narrow textile original fabrics; and topping at least one surface of the narrow textile original fabric with unvulcanized rubber.

4 Claims, 6 Drawing Sheets

(51) Int. Cl.
  *B29C 43/28*  (2006.01)
  *B65H 35/00*  (2006.01)
  *B26D 1/553*  (2006.01)
  *B26D 7/26*   (2006.01)
  *B29K 105/24* (2006.01)
  *B26D 1/00*   (2006.01)

(56) References Cited

U.S. PATENT DOCUMENTS

2009/0249597 A1    10/2009  Tatara et al.
2009/0249598 A1*   10/2009  Tatara .................... B29C 43/24
                                                   28/212
2016/0001502 A1    1/2016   Urabe

FOREIGN PATENT DOCUMENTS

| EP | 1226925 A1 | 7/2002 |
| JP | H07070869 A | 3/1995 |
| JP | 2011073439 A | 4/2011 |
| JP | 2012-161969 A | 8/2012 |
| WO | 2007007405 A1 | 1/2007 |

OTHER PUBLICATIONS

Extended European Search Report dated Sep. 1, 2017, issued in corresponding Application No. 17167137.3.

* cited by examiner

METHOD OF FORMING TOPPING SHEET AND APPARATUS THEREOF

CROSS-REFERENCE TO RELATED APPLICATIONS

This application claims priority of Japanese Patent Application No. 2016-88978 filed on Apr. 27, 2016, the content of which is incorporated herein by reference.

BACKGROUND OF THE INVENTION

Technical Field

The present invention relates to a method of forming a topping sheet and an apparatus thereof.

Related Art

For forming carcass ply that makes a skeleton of a pneumatic tire, first, a textile original fabric, obtained by weaving longitudinally aligned tire cords into a cord fabric by use of weft yarns, is prepared and then topped with unvulcanized rubber to form a topping sheet. Subsequently, the topping sheet is cut off into a length corresponding to a width of the carcass ply to form strip-shaped ply pieces. Further, non-cut ends of the ply pieces are sequentially connected to form a long ply original fabric. Then, the ply original fabric is wound around a shaping drum to be expanded outer-diametrically on the drum and molded by vulcanization in a tire vulcanizing mold, thereby forming carcass ply.

The carcass ply here has a different width depending on the size and specification of the pneumatic tire. Hence the ply original fabric is formed for each carcass ply. The ply original fabric is once stored in a wound state as an intermediate formed article (intermediate work-in-process) and is then released and supplied at the time of forming the corresponding pneumatic tire. This results in complex production control on the ply original fabric. In order to facilitate the production control on the ply original fabric, it has been proposed that the ply original fabric be directly supplied to a shaping step without being stored as the intermediate formed article (e.g., WO2007/007405A1).

The direct supply of the ply original fabric to the shaping step requires a compact configuration of an apparatus for forming the ply original fabric due to limitations on a facility placement space. For this reason, the topping sheet has been configured to have a width as narrow as about 0.5 m, for example.

However, the topping sheet is typically formed of a wide textile original fabric having a width of about 1.4 m to 1.5 m. That is, a narrow topping sheet has been formed by first topping a wide textile original fabric with the unvulcanized rubber to form a wide topping sheet, and then dividing this sheet widthwise. Another method has also been proposed where tire cords are supplied from a large number of cord bobbins to form a narrow cord original fabric, and this is topped with the unvulcanized rubber to form a narrow topping sheet (e.g., JP 2012-161969 A).

SUMMARY

According to the former method, since the wide topping sheet is topped with the unvulcanized rubber, dividing this sheet widthwise is not easy. Further, a calendar line that makes topping with the unvulcanized rubber increases in size widthwise in accordance with the wide textile original fabric. According to the latter method, while a calendar unit can be reduced in size, it takes labor to set the large number of cord bobbins. In short, it has not been possible to efficiently form the narrow topping sheet.

An object of the present invention is to efficiently form a narrow topping sheet.

According to one aspect of the present invention, there is provided a topping sheet forming method, the method includes feeding a textile original fabric, obtained by weaving longitudinally aligned tire cords into a cord fabric by use of weft yarns; cutting off the weft yarns at a predetermined widthwise position to divide the textile original fabric into a plurality of narrow textile original fabrics; and topping at least one surface of the narrow textile original fabric with unvulcanized rubber.

According to the present invention, previously dividing a wide textile original fabric into narrow textile original fabrics can lead to formation of a narrow topping sheet without requiring the wide textile original fabric to be divided after topped with unvulcanized rubber. With the narrow textile original fabrics topped with the unvulcanized rubber, a calendar line can be configured compactly widthwise. Further, dividing into the narrow textile original fabrics, having been narrowed, facilitates the handling thereof.

Preferably, the feeding a textile original fabric includes detecting widthwise displacement of the textile original fabric being fed; and moving the textile original fabric widthwise so as to eliminate the detected displacement.

According to the present configuration, the textile original fabric is fed while its widthwise displacement is prevented, thus leading to formation of narrow textile original fabrics prevented from varying widthwise. Moreover, the widthwise variations in the textile original fabric in a wound state can be eliminated, to thereby allow lowering of the requirement on quality of the widthwise variations for the textile original fabric in the wound state.

Preferably, the feeding a textile original fabric is to unwind the textile original fabric from an original fabric roll wound cylindrically, and the cutting off the textile original fabric is to cut off by means of a wire that are wound on the original fabric roll at a predetermined winding angle.

In a feeding part that starts feeding of the textile original fabric from the original fabric roll, the weft yarns are cut off by the wires to divide the textile original fabric into the plurality of narrow textile original fabrics. Dividing the textile original fabric by the wires facilitates cut-off of the weft yarns while preventing the tire cords from being cut off.

According to another aspect of the present invention, there is provided a topping sheet forming apparatus. The apparatus includes: a let-off part that feeds a narrow textile original fabric, obtained by dividing widthwise a woven textile original fabric provided with longitudinally aligned tire cords and weft yarns; and a calendar part that tops at least one surface of the narrow textile original fabric, having been fed by the let-off part, with unvulcanized rubber to form a narrow topping sheet.

According to the present invention, a narrow topping sheet can be formed efficiently.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, an embodiment according to the present invention is described in accordance with the attached drawings. Note that the following description is merely illustrative in nature and is not intended to limit the present invention, the application thereof, or the uses thereof. The drawings are made schematically, with dimensional ratios and the like different from actual ones.

Figure 10:
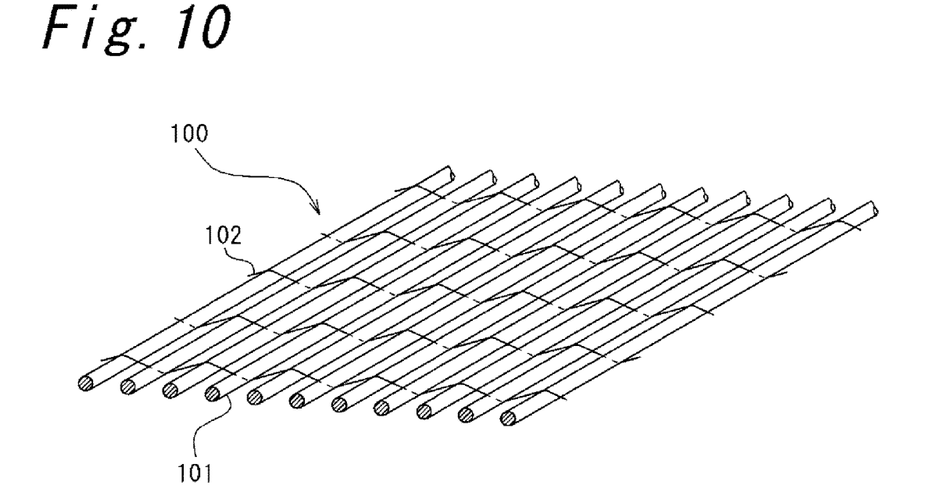
FIG. 10 is a perspective view schematically showing a textile original fabric.

A carcass ply forming step according to an embodiment of the present invention is as follows. First, as a cord original fabric preparing step, a textile original fabric 100 having tire cords 101 as cores is prepared. As shown in FIG. 10, the textile original fabric 100 is configured as a cord fabric woven by using as warps a plurality of longitudinally aligned tire cords 101 and providing weft yarns 102 as wefts at each required longitudinal interval.

Next, as a calendar step, at least one surface of the textile original fabric 100 is topped with unvulcanized rubber to create a topping sheet. Then, as a ply original fabric forming step, the topping sheet is cut off into a length corresponding to a width of the carcass ply to form strip-shaped ply pieces, and non-cut ends of the ply pieces are sequentially connected to form a long ply original fabric. Further, as a shaping step, the ply original fabric is wound around a shaping drum to be expanded outer-diametrically and molded by vulcanization in a tire vulcanizing mold, thereby forming carcass ply.

The present invention is characterized in that the wide textile original fabric is divided into the narrow textile original fabrics in the cord original fabric preparing step, and the narrow textile original fabrics are used to form the narrow topping sheet by the calendar step. Hereinafter, the calendar step and the ply original fabric forming step will be described, and the cord original fabric preparing step will then be described in detail.

(Calendar Step)

Figure 1:
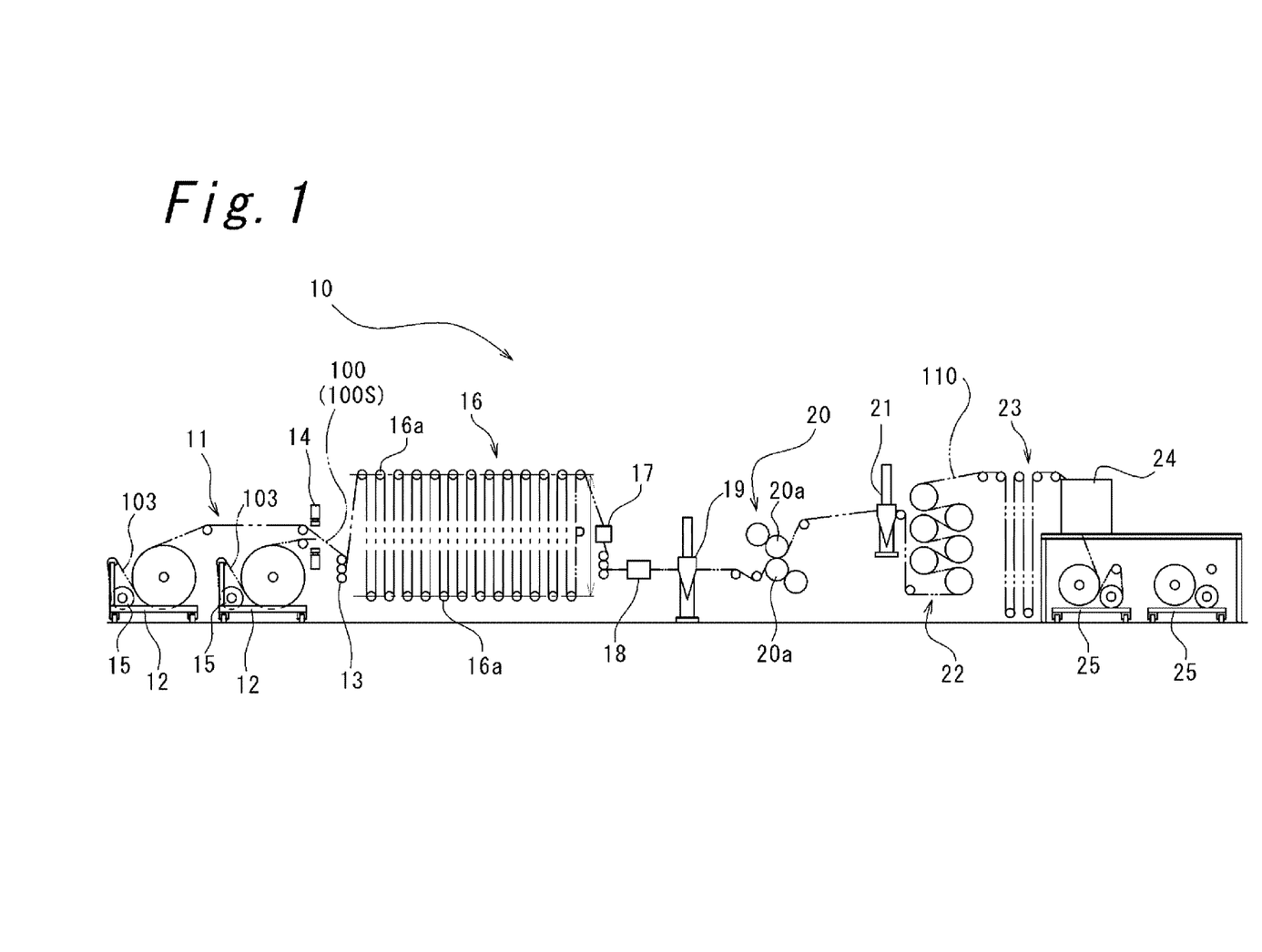
FIG. 1 is a view showing a schematic configuration of a calendar line.

FIG. 1 shows a schematic configuration of a calendar line 10 in which the calendar step is carried out. As shown in FIG. 1, a supply part 11 (let-off part) for the textile original fabric 100 is provided at an upstream end in a carrying-direction (the upstream is the left side in FIG. 1). While the textile original fabric 100 is fed (wound) downstream (to the right side in FIG. 1) from the supply part 11, at least one surface thereof is topped with the unvulcanized rubber by a calendar unit 20 (calendar part). The textile original fabric 100 then passes through a cooling unit 22, and is thereafter wound up cylindrically to a wind-up cart 25 by the topping sheet wind-up unit 24.

The textile original fabric 100 to be supplied to the calendar line 10 is wound cylindrically by the cord original fabric preparing step described later, and supported on a cart 12 in a feedable manner. In the supply part 11, two carts 12, 12 are provided side by side (adjacent to each other) in the feeding direction of the textile original fabric 100. The feeding unit 13 located downstream from these carts feeds a textile original fabric 100 from one of the two carts 12.

A junction unit 14 is provided between the supply part 11 and the feeding unit 13. When a terminal end of the textile original fabric 100 being fed from one cart 12 of the two carts 12, 12 comes out, the junction unit 14 joints this terminal end with a starting end of the textile original fabric 100 being fed from the other cart 12. Hence the textile original fabric 100 is successively fed regardless of switching between the feeding carts 12.

Numeral 15 denotes a film wind-up unit for winding up a film member 103 being wound together with the textile original fabric 100, in association with feeding of the textile original fabric 100. The film wind-up unit 15 is provided on the cart 12. Note that the film member 103 is wound together with the textile original fabric 100 so as to prevent the textile original fabric 100 in the wound state from falling and/or attaching to a winding layer formed by winding on the inner diameter side.

A first festoon unit 16 is provided downstream from the feeding unit 13. The first festoon unit 16 includes a plurality of vertically disposed rollers 16a, and the plurality of rollers 16a are configured with vertical pitches P1 being variable. The textile original fabric 100 is wound on the plurality of rollers 16a in a vertically alternate manner. That is, the first festoon unit 16 can make a carrier path longer by extending the pitch P1, to store a required amount of the textile original fabric 100 as a buffer. The first festoon unit 16 can make the carrier path shorter by shortening the pitch P1, to supply the textile original fabric 100 downstream from the buffer.

That is, when the feeding of the textile original fabric 100 is to be temporarily stopped in the supply part 11, e.g., when the feeding cart 12 is to be switched, the first festoon unit 16 supplies downstream the textile original fabric 100 stored as the buffer. Namely, it is possible to prevent stoppage of the calendar line 10 and prevent a decrease in operating rate of the calendar line 10.

A centering unit 17, a weft yarn removing unit 18, and a first dancer unit 19 are provided in this order downstream from the first festoon unit 16. The centering unit 17 adjusts a widthwise position of the textile original fabric 100 to the center. The weft yarn removing unit 18 divides the weft yarns 102 of the textile original fabric 100 and removes them from the tire cords 101.

The calendar unit 20 is provided downstream from the first dancer unit 19. The calendar unit 20 allows passage of the plurality of tire cords 101 between a pair of calendar rolls 20a, 20a, to top at least one surface of the tire cord 101 with the unvulcanized rubber.

A second dancer unit 21 and the cooling unit 22 are provided in this order downstream from the calendar unit 20. A topping sheet 110 obtained by topping with the unvulcanized rubber in the calendar unit 20 passes through the second dancer unit 21 and is then cooled by the cooling unit 22.

A second festoon unit 23 and a topping sheet wind-up unit 24 are provided in this order downstream from the cooling unit 22. Two wind-up carts 25, 25 are disposed in the topping sheet wind-up unit 24, and the topping sheet 110 carried through the second festoon unit 23 is alternately wound up to the two carts 25. Note that the second festoon unit 23 ensures the buffer at the time of switching the cart 25, to prevent stoppage of the calendar line 10.

(Ply Original Fabric Forming Step)

Figure 2:
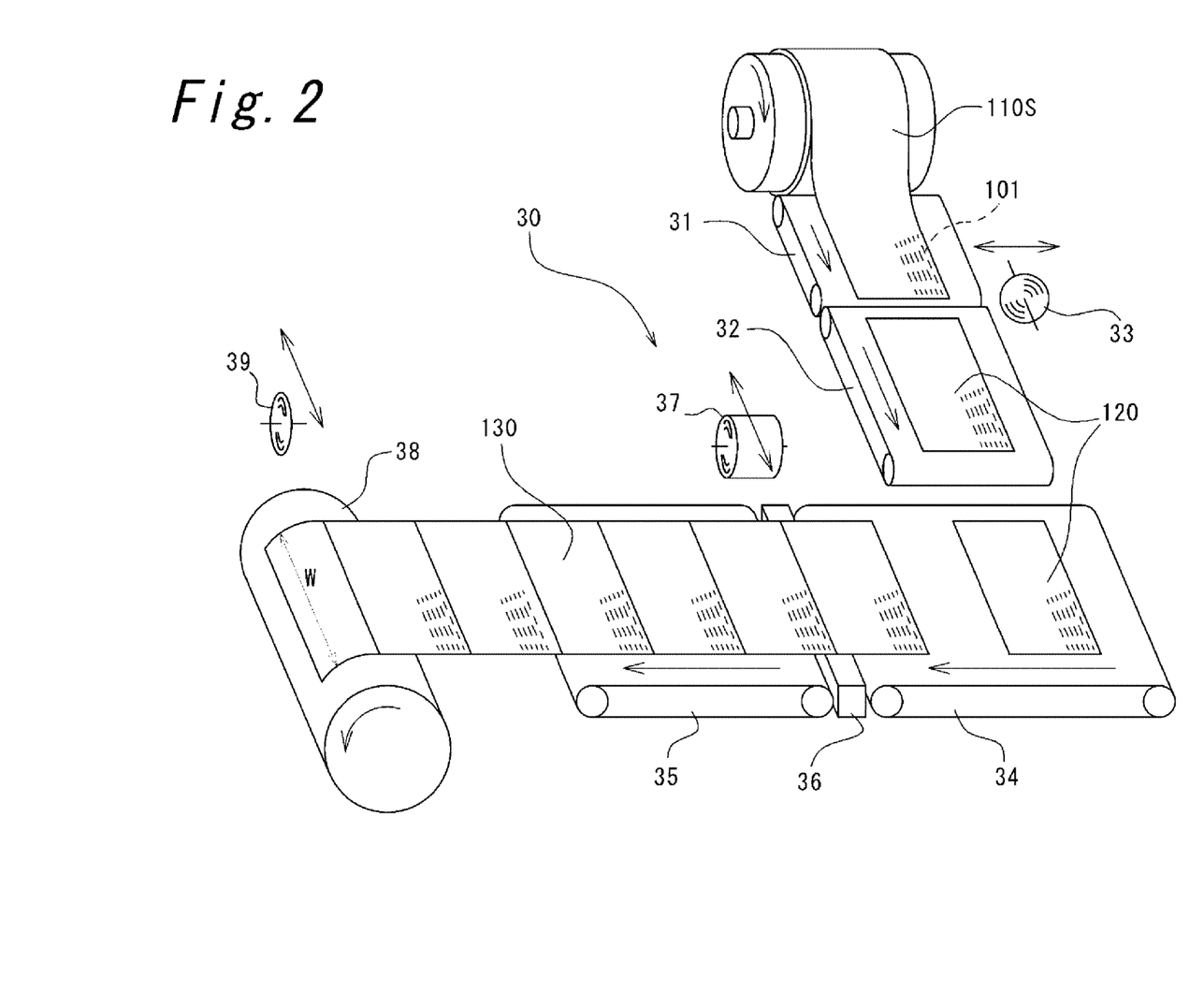
FIG. 2 is a view schematically showing a ply original fabric forming step.

FIG. 2 schematically shows a ply original fabric forming line 30 where the ply original fabric forming step is carried out. As shown in FIG. 2, the first half of the ply original fabric forming line 30 is provided with a first conveyor 31 and a second conveyor 32 that feed the cylindrically wound topping sheet 110 with a predetermined length, and a first cutting unit 33 that moves widthwise between these conveyors. The latter half of the ply original fabric forming line 30 is provided with a third conveyor 34, a fourth conveyor 35, a coupling stage 36 located between these conveyors, and a pressing unit 37 movable widthwise on the coupling stage 36.

That is, in the first half of the ply original fabric forming line 30, the topping sheet 110 with the predetermined length is fed by the first and second conveyors 31, 32, and then cut off by the first cutting unit 33 into strip-shaped ply pieces 120. The predetermined length is here set to a length corresponding to a width W of the carcass ply. In the present embodiment, the topping sheet 110 is cut off at an angle substantially orthogonal to the tire cord 101, but it may be cut off at an angle of about 75° to 90° with respect to the tire cord 101 so as to form carcass ply for a pneumatic radial tire.

Subsequently, the strip-shaped ply pieces 120 are transferred to the latter half of the ply original fabric forming line 30, and carried parallel to the direction of the cutting by the first cutting unit 33 (i.e., perpendicularly to the carrying direction in the first half) by the third and fourth conveyors 34, 35. At this time, the third and fourth conveyors 34, 35 operate such that a rear edge of the preceding ply piece 120 in the carrying-direction is butted with a front edge of the subsequent ply piece 120 in the carrying-direction on the coupling stage 36. The pressing unit 37 moves widthwise while the mutually facing edges of the sequentially carried ply pieces 120 are butted with each other on the coupling stage 36, to sequentially couple these ply pieces 120.

That is, the strip-shaped ply pieces 120 are cut off from the topping sheet 110, and the ply pieces 120 are sequentially coupled, to form the long ply original fabric 130. The ply original fabric 130 is directly supplied to the tire shaping step without being wound up cylindrically, and is then wound on a shaping drum 38. The ply original fabric 130 wound on the shaping drum 38 is cut off by a second cutting unit 39 to have a length corresponding to a circumferential length of the tire.

(Cord Original Fabric Preparing Step)

In the cord original fabric preparing step, narrow textile original fabrics 100S are formed. In this step, the textile original fabric 100 is typically formed to be wide, having a width of about 1.4 m to 1.5 m (hereinafter referred to as a wide textile original fabric 100L), whereas in the cord original fabric preparing step, this wide textile original fabric 100L is divided widthwise into the narrow textile original fabrics 100S having a width of about 0.45 m to 0.5 m.

Figure 3:
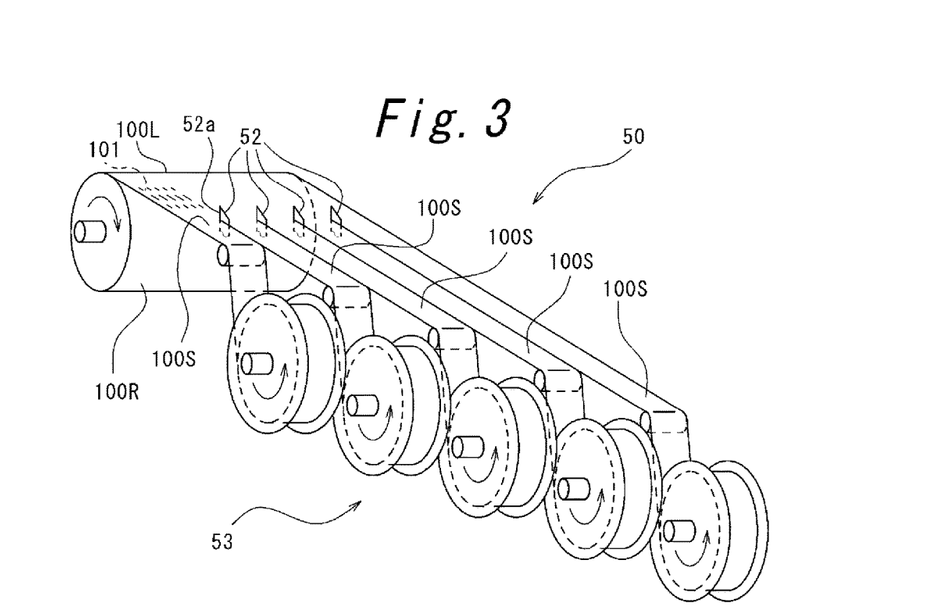
FIG. 3 is a perspective view schematically showing a cord original fabric preparing step.

FIG. 3 is a perspective view showing a schematic configuration of a slitter unit 50 that cuts off the wide textile original fabric 100L widthwise in the cord original fabric preparing step. As shown in FIG. 3, the slitter unit 50 includes a cart 51 (cf. FIG. 5) that supports the wide textile original fabric 100L in a feedable manner, a plurality of cutters 52 disposed in predetermined widthwise positions on a path for the textile original fabric 100L being fed, and a plurality of narrow original fabric wind-up parts 53 located downstream from the cutters 52.

The cutter 52 is a platy member, which is disposed parallel to the tire cord 101 of the wide textile original fabric 100L being fed, between the adjacent tire cords 101. A cutting edge 52a is provided at an upstream edge of the cutter 52 in a feeding-direction, and the cutting edge 52a penetrates the wide textile original fabric 100L from one surface to the other surface thereof. That is, the weft yarns 102 of the wide textile original fabric 100L having been fed are cut off by the plurality of cutters 52 and divided widthwise into the plurality of narrow textile original fabrics 100S.

Note that the plurality of cutters 52 are supported movably widthwise by a cutter support member (not shown). Changing the widthwise positions of the plurality of cutters 52 leads to formation of the narrow textile original fabrics 100S having desired widths. In the present embodiment, since four cutters 52 are located at regular intervals widthwise, five narrow textile original fabrics 100S are formed to have the same widths. By making the widthwise intervals of the adjacent cutters 52 different, the plurality of narrow textile original fabrics 100S are formed to have different widths.

Figure 4:
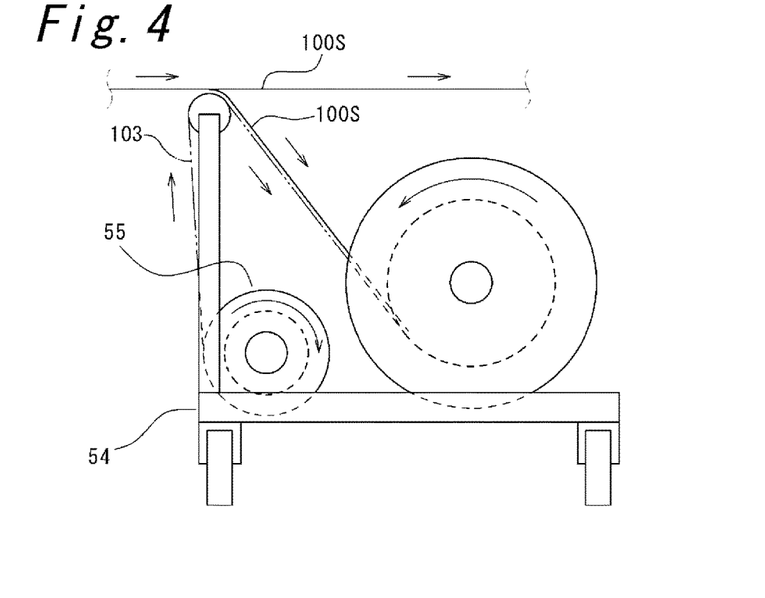
FIG. 4 is a main-part side view of FIG. 3, showing a narrow original fabric wind-up part.

The narrow original fabric wind-up part 53 is configured so as to wind up the divided narrow textile original fabrics 100S to a plurality of carts 54 (cf. FIG. 4). The carts 54 are provided in accordance with the number of division of the plurality of divided narrow textile original fabrics 100S. That is, in the present embodiment, since the textile original fabric 100L is divided into the five narrow textile original fabrics 100S, five carts 54 are provided accordingly. The five carts 54 are disposed so as to be located in different positions in the feeding direction of the narrow textile original fabric 100S.

FIG. 4 is a main-part side view of FIG. 3, showing a side view of one cart 54 in the narrow original fabric wind-up part 53. As shown in. FIG. 4, a film supplying unit 55 is provided on the cart 54. The film supplying unit 55 supplies the film member 103 in association with wind-up of the narrow textile original fabric 100S, and hence the narrow textile original fabric 100S is wound together with the film member 103. The film member 103 is configured to have a width equivalent to or larger than that of the narrow textile original fabric 100S, and prevents the narrow textile original fabric 100S in the wound state from falling and/or attaching to the winding layer on the inner diameter side.

Note that the cart 54 and the cart 12 in the supply part 11 of the calendar line 10 may be configured as a common cart. In this case, the film wind-up unit 15 on the cart 12 is configured to opera,e also as the film supplying unit 55 on the cart 54.

That is, in the cord original fabric preparing step, the wide textile original fabric 100L is divided widthwise by the slitter unit 50 to form a plurality of narrow textile original fabrics 100S.

According to the present embodiment, supplying the narrow textile original fabric, having been narrowed, to the calendar step allows the calendar line 10 to be configured compactly widthwise. Further, topping the narrow textile original fabric 100S, having been narrowed, with the unvulcanized rubber can form the narrow topping sheet 110 while eliminating the labor to divide the wide topping sheet 110. Moreover, forming the textile original fabric 100 and the topping sheet 110 into narrow widths facilitate handling of these. Hence the narrow topping sheet 110 can be formed efficiently.

Figure 5:
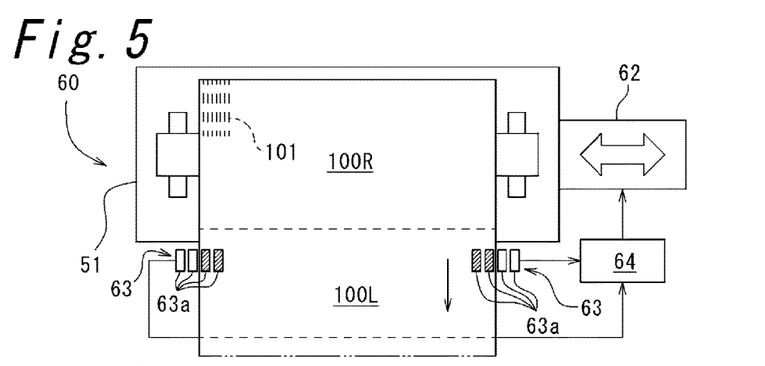
FIG. 5 is a plan view schematically showing a slitter unit according to a modified example.

FIG. 5 shows a slitter unit 60 according to a modified example in the cord original fabric preparing step. In addition to the slitter unit 50 described above, the slitter unit 60 further includes a cart moving unit 62 capable of moving the cart 51 widthwise along the textile original fabric 100, a detection device 63 that detects the position of the widthwise end of the wide textile original fabric 100L being fed from the cart 51, and a control unit 64 that operates the cart moving unit 62 based on the detection result of the detection device 63.

The cart moving unit 62 is configured such that rotationally driving a ball screw, for example, can move the cart 51 to a desired widthwise position of the textile original fabric 100.

The detection device 63 is made up of a plurality of photoelectric tubes 63a provided in parallel widthwise in the vicinities of the ends. In the present embodiment, four photoelectric tubes 63a are provided in parallel widthwise in the vicinity of each of the widthwise ends.

The control unit 64 includes a displacement detecting part that detects a widthwise displacement amount Z (cf. FIG. 6A) of the end of the textile original fabric 100 based on the detection result of the detection device 63) and a drive controlling part that drives and controls the cart moving unit 62. On the basis of the detection result of the detection device 63, namely the detection results of the plurality of photoelectric tubes 63a, the displacement detecting part detects the widthwise displacement amount Z at the end of the textile original fabric 100. The driving controlling unit drives and controls the cart moving unit 62 so as to move the cart 51 widthwise along the textile original fabric 100 based on the widthwise displacement amount Z of the textile original fabric 100 which has been detected by the displacement detecting part, so as to eliminate the displacement.

Figure 6A:
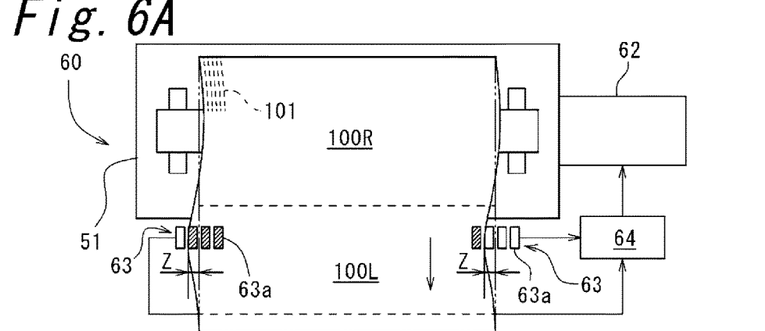
FIG. 6A is a view for explaining a work of the slitter unit shown in FIG. 5.

For example, as shown in FIG. 6A, when three widthwise inner-end photoelectric tubes 63a of the photoelectric tubes 63a on the left side of the plurality of photoelectric tubes 63a detect the textile original fabric 100 and one widthwise inner-end photoelectric tube 63a of the photoelectric tubes 63a on the right side of the above photoelectric tubes 63a detects the textile original fabric 100 as shown by hatching in the figure, the displacement detecting part detects that the textile original fabric 100 fed from the cart 51 is being fed to a widthwise biased position (on the left in the figure) by the displacement amount Z. In FIG. 6A, symbol Z denotes an amount of displacement with respect to the wide textile original fabric 100L being fed to the widthwise center.

Figure 6B:
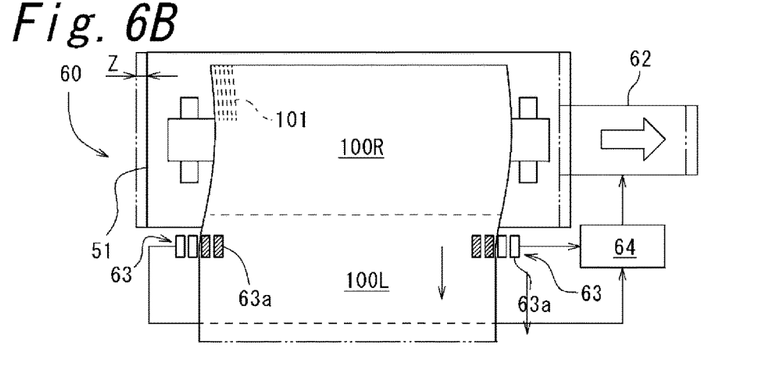
FIG. 6B is a view for explaining a work of the slitter unit shown in FIG. 5.

In this case, a driving controlling part 642 drives and controls the cart moving unit 62 so as to eliminate the widthwise displacement of the textile original fabric 100 being fed. That is, the driving controlling part 642 drives and controls the cart moving unit 62 so as to move the cart 51 by the displacement amount Z in the direction (to the right in the figure) opposite to the displacement direction (the left in the figure), so as to eliminate the displacement of the textile original fabric 100. The cart 51 is thus moved to the right by the displacement amount Z as shown in FIG. 6B, thereby eliminating the widthwise displacement and centering the textile original fabric 100 fed from the cart 51.

That is, in the slitter unit 60 according to the modified example, the textile original fabric 100 is fed while the widthwise displacement is prevented, and the textile original fabric 100 is then divided widthwise and wound up to the carts 54. This enables formation of the narrow textile original fabrics 100S prevented from varying widthwise. Moreover, the widthwise variations in the wide textile original fabric 100L in the wound state can be eliminated, to thereby allow lowering of the requirement on quality of the widthwise variations for the wide textile original fabric 100L in the wound state.

Figure 7:
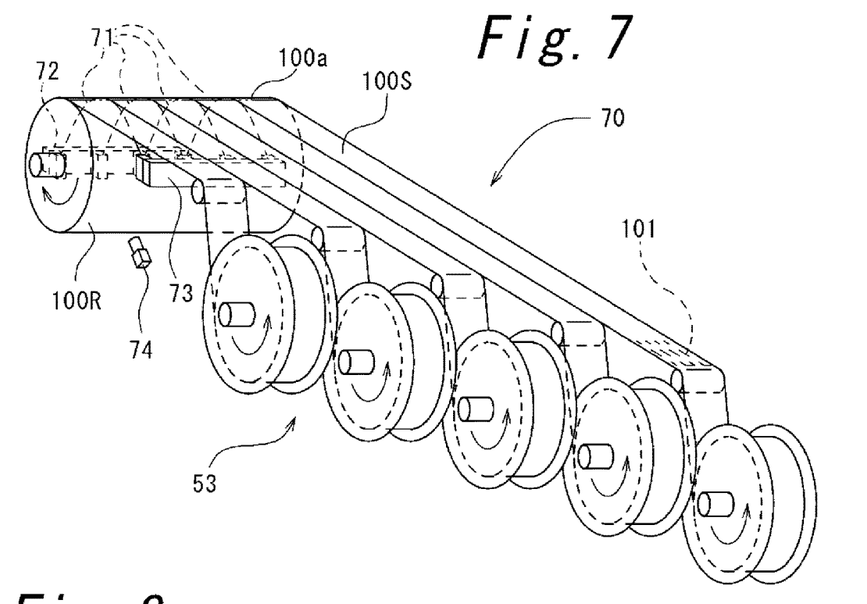
FIG. 7 is a perspective view schematically showing a slitter unit according to a further modified example.

FIG. 7 shows a slitter unit 70 according to a further modified example in the cord original fabric preparing step. With respect to the slitter units 50, 60 described above, the slitter unit 70 includes a plurality of wires 71 in place of the plurality of cutters 52. The slitter unit 70 further includes a lifting unit 72 that is coupled to one end of each of the plurality of wires 71 and is vertically movable, a weight 73 coupled to the other end of each of the plurality of wires 71, an outer diameter detecting unit 74 that detects an outer diameter of the cylindrically wound textile original fabric 100 (hereinafter referred to as an original fabric roll 100R), and a control unit 75 (cf. FIG. 8) that controls the operation of the lifting unit 72 based on the detection result of the outer diameter detecting unit 74.

Figure 8:
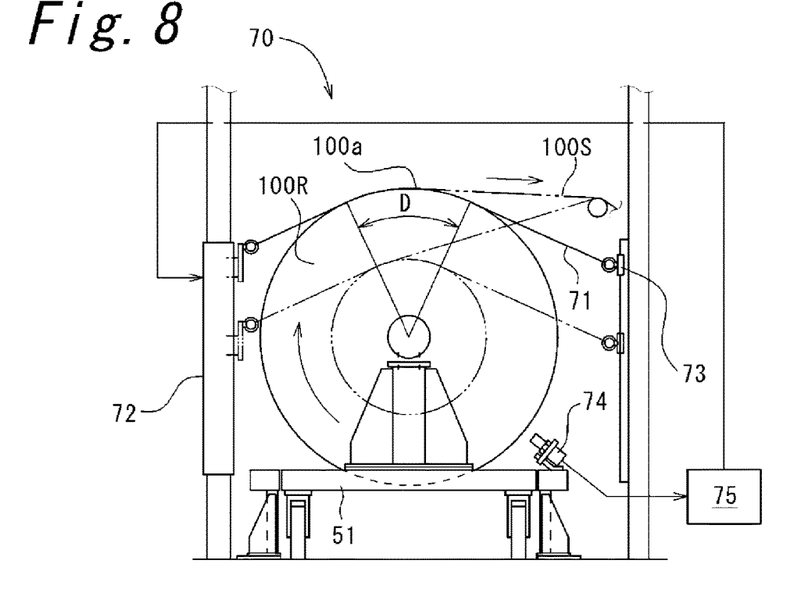
FIG. 8 is a main-part side view of FIG. 7.

The wire 71 is disposed parallel to the tire cord 101 of the wide textile original fabric 100L being fed, between the adjacent tire cords 101, and is wound on the original fabric roll 100B over a predetermined winding angle range D (cf. FIG. 8). One ends 71a of the plurality of wires 71 are supported on the lifting unit 72, movably along the axial line of the original fabric roll 100R. The lifting unit 72 is configured in a vertically liftable manner by rotationally driving a ball screw, for example. The weight 73 keeps tensile force of the wire 71 substantially constant. The outer diameter detecting unit 74 is made up of an ultrasonic sensor, for example.

The control unit 75 drives and controls the lifting unit 72 so as to keep the predetermined winding angle range D for the wires 71 based on the outer diameter of the original fabric roll 100R, which has been detected by the outer diameter detecting unit 74. That is, the control unit 75 lowers the lifting unit 72 in association with reduction in outer diameter of the original fabric roll 100R due to the feeding.

FIG. 8 is a main-part side view of the slitter unit 70, showing the periphery of the original fabric roll 100R. As shown in FIG. 8, the wire 71 is wound on the original fabric roll 100R in the predetermined winding angle range D. The predetermined wiring angle range D is set so as to include a feeding point 100a at which the wide textile original fabric is fed from the original fabric roll 100R. The predetermined winding angle range D is preferably set in a winding angle range of not smaller than 45 degrees and not larger than 60 degrees, and more preferably set in an angle range with the feeding part 100a taken as a substantially center value. In the present modified example, the feeding part 100a is located at the upper end of the original fabric roll 100R, and the winding angle range D for the wire 71 is set in substantially the same range on the right and left with the upper end taken as the center, in a side view of FIG. 8.

That is, the weft yarns 102 of wide textile original fabric 100W being fed from the original fabric roll 100R are cut off by the plurality of wires 71 and divided into the plurality of narrow textile original fabrics 100S in the feeding part 100a. Note that, even when widthwise displacement has occurred, the tire cord 101 is guided to a desired widthwise position without being damaged by the wire 71. That is, the use of the wire 71 enables division of the wide textile original fabric 100L into the narrow textile original fabrics 100S without undesirably damaging the tire cord 101.

Further, as shown by chain double-dashed lines in FIG. 8, when the outer diameter of the original fabric roll 100R is reduced in association with feeding of the textile original fabric 100, the lifting unit 72 is lowered to keep the predetermined winding angle D for the wire 71. Hence the wide textile original fabric 100L can be stably divided into the narrow textile original fabrics regardless of the change in outer diameter of the original fabric roll 100R.

In place of the outer diameter detecting unit 74, the change in outer diameter of the original fabric roll 100R may be estimated based on an amount of feeding from the original fabric roll 100R. For example, by measuring the change in weight of the original fabric roll 100R (which may include a weight of the cart 51), the amount of the wide textile original fabric 100L fed from the original fabric roll 100R may be calculated, to estimate the outer diameter of the original fabric roll 100R.

Figure 9:
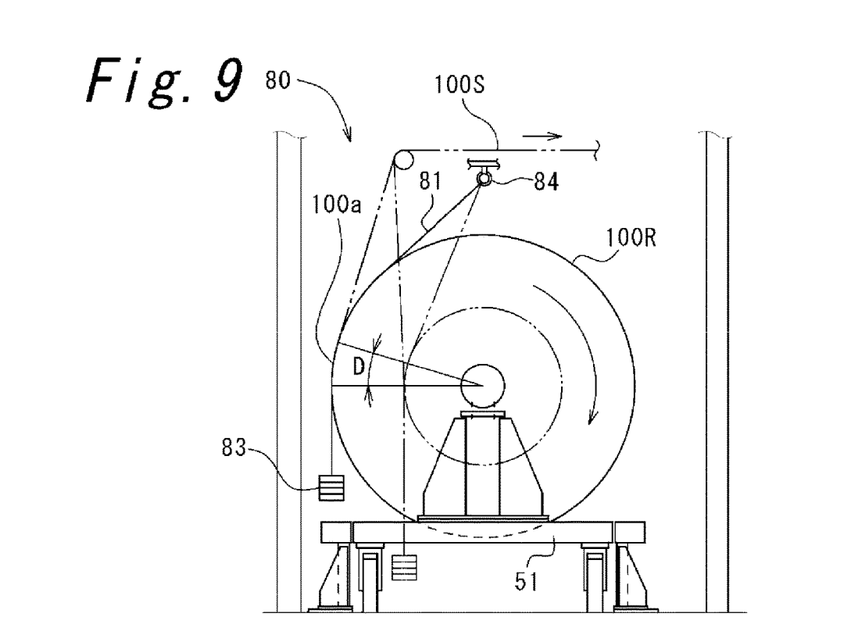
FIG. 9 is a main-part side view schematically showing a further modified example of the slitter unit of FIG. 7.

FIG. 9 shows a slitter unit 80 according to a further modified example in cases where the division is carried out by using wires. With respect to the slitter unit 70, the slitter unit 80 needs not to include the lifting unit 72, the outer diameter detecting unit 74, or the control unit 75, and the method of supporting the wire 81 is changed. Specifically, one end of the wire 81 is fixed to a supporting point 84 above the original fabric roll 100R, and the other end thereof is coupled with a weight 83. The wire 81 extends vertically while being wound on the side of the original fabric roll 100R.

The feeding part 100a of the original fabric roll 100R is set so as to be located in a substantially center position of the winding angle range D for the wire 81. This eliminates the need for the lifting unit 72, the outer diameter detecting unit 74, and the control unit 75, and the wire 81 can be wound on the side of the feed position of the original fabric roll 100R without being influenced by the change in outer diameter of the original fabric roll 100R. That is, with the simple configuration, it is possible to stably divide the wide textile original fabric 100L into the narrow textile original fabrics 100S regardless of the change in outer diameter of the original fabric roll 100R, without causing damage on the tire cord 101.

What is claimed is:

1. A topping sheet forming method, comprising:
   feeding a textile original fabric, obtained by weaving longitudinally aligned tire cords into a cord fabric by use of weft yarns, from an original fabric roll in which the textile original fabric is wound cylindrically;
   cutting only the weft yarns at a predetermined widthwise position to divide the textile original fabric into a plurality of narrow textile original fabrics; and
   topping at least one surface of the narrow textile original fabric with unvulcanized rubber,
   wherein the feeding a textile original fabric comprising:
   detecting widthwise displacement of the textile original fabric being fed, and
   moving the original fabric roll widthwise so as to eliminate the detected displacement.

2. The topping sheet forming method according to claim 1,
   wherein the cutting off the textile original fabric is to cut off by means of a wire that are wound on the original fabric roll at a predetermined winding angle.

3. A topping sheet forming method, comprising:
   feeding a textile original fabric, obtained by weaving longitudinally aligned tire cords into a cord fabric by use of weft yarns, from an original fabric roll in which the textile original fabric is wound cylindrically;
   cutting off the weft yarns at a predetermined widthwise position to divide the textile original fabric into a plurality of narrow textile original fabrics; and
   topping at least one surface of the narrow textile original fabric with unvulcanized rubber,
   wherein the feeding a textile original fabric including:
   detecting widthwise displacement of the textile original fabric being fed, and
   moving the original fabric roll widthwise so as to eliminate the detected displacement.

4. The topping sheet forming method according to claim 3,
   wherein the feeding a textile original fabric is to unwind the textile original fabric from an original fabric roll wound cylindrically, and
   wherein the cutting off the textile original fabric is to cut off by means of a wire that are wound on the original fabric roll at a predetermined winding angle.

* * * * *